United States Patent

Dolan

[11] 4,147,415
[45] Apr. 3, 1979

[54] ENERGY TRAP

[76] Inventor: Myles G. Dolan, 3600 NW. 60 St., Miami, Fla. 33142

[21] Appl. No.: 873,108

[22] Filed: Jan. 30, 1978

[51] Int. Cl.² .............................................. G02B 7/00
[52] U.S. Cl. ................................................... 350/321
[58] Field of Search ........... 350/293, 294, 321, 96.10, 350/96.28; 126/270, 271; 250/228, 227; 181/268; 84/264; 242/71.1, 55.2; 206/408; 362/32, 310, 302, 303; 356/102-104

[56] References Cited

U.S. PATENT DOCUMENTS

| | | | |
|---|---|---|---|
| 3,035,658 | 5/1962 | Abbuhl | 181/268 |
| 3,195,720 | 7/1965 | Canniere et al. | 242/71.1 |
| 3,346,210 | 10/1967 | Carstensen et al. | 242/71.1 |
| 3,384,318 | 5/1968 | Nerwin et al. | 242/71.1 |
| 3,408,909 | 11/1968 | Kisselmann et al. | 242/71.1 |

*Primary Examiner*—Jon W. Henry

[57] ABSTRACT

An energy trap comprising a body with a mouth and an internal reflective surface arranged in such a fashion that incoming wave energy is reflected internally and not externally so as to not escape from the trap.

4 Claims, 2 Drawing Figures

ENERGY TRAP

FIELD OF THE INVENTION

This invention relates to a device to trap wave energy.

BACKGROUND OF THE INVENTION

In the past there have been numerous types of heat collectors and devices for trapping wave energy. This invention is of such a device.

Representative prior art is found in U.S. Pat. Nos. 2,719,475; 2,859,745; 3,029,596; 3,923,039; 3,974,824; 3,991,740; 4,002,499.

OBJECTS OF THE INVENTION

It is an object of this invention to provide an improved trap for use in collecting wave energy.

In accordance with the foregoing general objects, it is, further, an object of this invention to provide a new and useful energy source trap which may be manufactured and utilized in a manner so as to reduce energy cost and which is simple and inexpensive in construction and well adapted for the purposes intended.

DESCRIPTION OF THE PREFERRED EMBODIMENT

Figure 1:
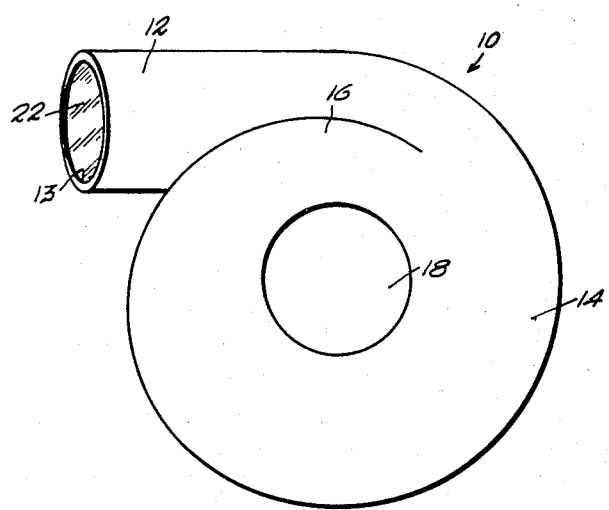
FIG. 1 is a perspective view of a device constructed in accordance with this invention.
Figure 2:
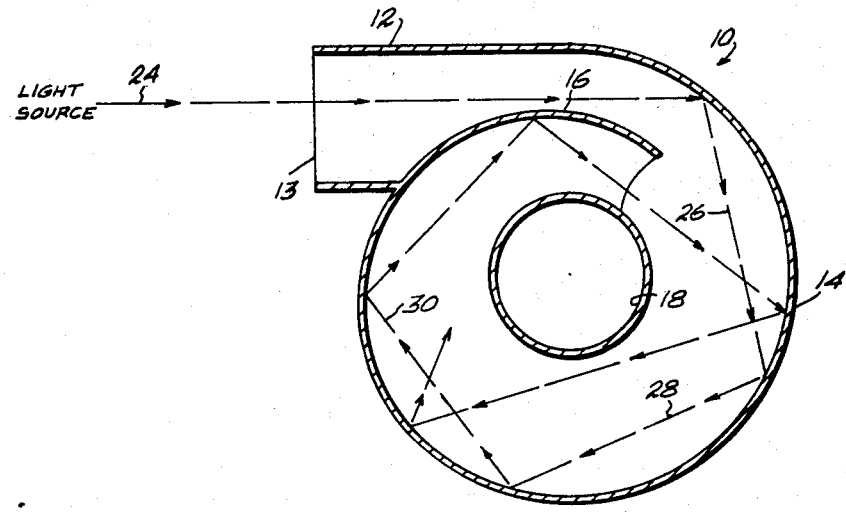
FIG. 2 is a view in cross section taken on a midplane of the device shown in FIG. 1.

Referring to the drawings wherein like reference characters designate like or corresponding parts throughout the several views, the trap is generally designated by the numeral 10 and it includes a tubular body, generally speaking, which includes an entrance zone which is hollow and which leads to a curved zone 14 which generally, traces a substantial portion of a circle and terminates in an end zone 16 which is aimed in such a way that a tangent to it intersects the wall of the portion 14. To the entrance mouth 13 light rays from a light source such as 24 are adapted to enter and since the interior surface is shiny or reflective, as indicated by the numeral 22, light entering will be deflective according to traditional optic theory traversing a path indicated by the lines 26, 28, 30, etc. and continuing in this manner so as not to be able to escape with the result that the heat energy or light energy or sound waves introduced into the trap are absorbed and turned into heat energy. The tubular body 10 is provided with a central hole 18. Generally speaking, this invention provides an energy source which can be created through the manufacture and utilization of a cylinder of unique structure and design as set forth in the drawings and hereinafter. It is designed for light and sound wave retention through the use of a solar or sonic trap construction described in the drawings and herein. Both the solar and sonic traps are based on the use of a uniquely designed and constructed generally cylindrical apparatus which permits the entry of light or sound waves and then redirects them in a reflective path into a predetermined flow, that is, by a highly mirrorized interior surface back into the cylinder by natural reflection.

In accordance with this invention and the claims set forth herein, the spirit and scope of this invention are of an energy trap device.

What is claimed is:

1. An apparatus for trapping wave energy comprising:
    a shell-like tubular body having a hollow center and defining a central hole, generally in the middle of the shell-like tubular body, with a straight entrance zone, and having a single entrance, said single entrance being
    a tapered entrance adjacent the straight entrance zone wherein a wall is provided in the straight entrance zone forming an interior mouth,
    a circular zone adjacent the interior mouth zone whereby the straight entrance zone is tangential to the circular zone, and
    a generally rounded circular interior body circumposed about the central hole whereby wave energy passing through the straight entrance zone is reflected in the interior mouth zone and directed by the reflection and the fact that the angle of incidence equals the angle of reflection to the circular zone where it is re-reflected to the interior.

2. The apparatus for trapping wave energy as in claim 1 wherein the apparatus is of metal construction.

3. The apparatus for trapping energy as in claim 1 or claim 2 wherein the shell-like tubular body has an interior made of highly mirrored material.

4. The apparatus for trapping energy as in claim 3 wherein the apparatus is of one-piece construction.

* * * * *